United States Patent
Hall et al.

[19]

[11] Patent Number: 6,055,846
[45] Date of Patent: May 2, 2000

[54] METHOD AND APPARATUS FOR IN SITU CALIBRATION OF GAS FLOWMETERS

[75] Inventors: Kenneth R. Hall; Gerald L. Morrison, both of College Station; James C. Holste, Bryan, all of Tex.

[73] Assignee: The Texas A&M University System, College Station, Tex.

[21] Appl. No.: 08/822,596

[22] Filed: Mar. 20, 1997

Related U.S. Application Data

[60] Provisional application No. 60/013,741, Mar. 20, 1996.

[51] Int. Cl.⁷ .................................................... G01R 27/26
[52] U.S. Cl. ......................... 73/24.05; 73/30.02; 73/724; 324/663; 324/673
[58] Field of Search ................................ 73/24.05, 30.01, 73/30.02, 30.03, 1.16, 1.35, 724, 861.14, 861.15; 324/658, 663, 673

[56] References Cited

U.S. PATENT DOCUMENTS

| | | | |
|---|---|---|---|
| 3,478,589 | 11/1969 | Birken | 73/724 X |
| 3,903,478 | 9/1975 | Stuart et al. | 324/673 X |
| 5,670,721 | 9/1997 | Codin et al. | 73/724 X |

*Primary Examiner*—Daniel S. Larkin
*Attorney, Agent, or Firm*—Gunn & Associates, P.C.

[57] ABSTRACT

The focus of this paper is to introduce a novel method for calibrating natural gas flowmeters. This new method can accommodate very large flow rates and it avoids common problems associated with current techniques for meter proving. In this method, the amount of gas accumulated in a vessel of fixed volume is determined by measuring the change in capacitance of the vessel with respect to time. Because the accumulator has a fixed volume the problems inherent with the mechanical motions involved in volumetric provers such as bell provers, piston provers and ball provers are eliminated. Accurate measurements can also be made in larger vessels than would be feasible for gravimetric provers, especially for in situ calibrations. Along with avoiding the fundamental problems associated with current provers, initial studies indicate that accuracies of ±0.1% are possible, even for flow rates in large pipelines.

27 Claims, 2 Drawing Sheets

METHOD AND APPARATUS FOR IN SITU CALIBRATION OF GAS FLOWMETERS

This application claims the benefit of U.S. Provisional No. 60/013,741, Mar. 20, 1996.

BACKGROUND OF THE DISCLOSURE

Custody transfer transactions involving natural gas usually are based upon measurements made by a flowmeter mounted in the gas transmission line. Because flowmeters may be affected over a period of time by the presence of foreign material in the gas streams and because they are susceptible to error due to the turbulence in gas pipelines caused by elbows and valves, there is a need for in situ calibration of flowmeters to ensure that the performance remains within the accuracy specifications for the meter. The general principle usually employed in meter proving methods involves making an independent measurement of the amount of gas flowing through the meter. Typically this independent measurement requires collecting the gas which passes through the meter and then determining the amount of gas by one of two methods: 1) determining the amount of material accumulated within a fixed volume; or 2) measuring the rate at which the accumulator volume increases. Another method sometimes used in industry is a two-step method where a transfer standard such as a turbine meter is calibrated against a primary standard and then used for extensive calibration tests. This also works with the new method presented in this disclosure wherein this method is the primary standard.

The most common method of determining the amount of gas in a fixed volume accumulator is by direct weighing. The major disadvantage associated with the application of this method is that any container that can withstand the pressure normally encountered in natural gas pipelines will be sufficiently heavy that extreme precision is required in the weighing operation. As a result, it is unlikely that an accurate method could be developed based upon direct weighing that would provide calibrations accurate to better than 1% and be mobile enough to be transported to field meter locations. The problem becomes even more difficult if high flow rates and large line sizes are involved. Direct weighing can be used in laboratory situations for large flow rates, but portable gravimetric devices do not appear to be feasible at this time.

A second method used to determine the amount of gas in a fixed volume accumulator involved measuring the pressure and temperature of the gas. Once the volume of the accumulator is determined from a calibration experiment, the amount of material present may be calculated. However, because the pressure varies essentially linearly with temperature in a fixed volume, this method is highly susceptible to errors which are introduced by temperature gradients within the tank. This method is rarely used outside of carefully controlled laboratory conditions and is of little use for portable field calibrations.

Volumetric provers are even more difficult to operate reliably than gravimetric provers for large volume flows. This is because the control of the variable volume must be such that the pressure and temperature of the gas within the meter prover remains fixed during the experiment and the rate of increase in the volume is measured accurately at the same time. Measurement of large flow rates requires precise control and measurements of rapid mechanical movement. As the total flow rate increases, the reliability of all volumetric provers deteriorates rapidly.

The proposed new method for calibration of natural gas flowmeters overcomes shortcomings of the existing methods. This novel method measures the capacitance of a structure installed within a fixed volume accumulator. It will allow for easy portability and can be used with very large flow rates. The maximum flow rate measurable is determined strictly by the volume of the fixed accumulator, which for portable devices is limited only by the limits set for the maximum length and width allowed for vehicles on the highway. So this method avoids the problems associated with other techniques while at the same time it provides for easy portability and better accuracy.

This disclosure is directed to a different type of calibration apparatus. It uses a fixed volume container, and avoids the problem of weighing the container to obtain extremely small weight variations. A two plate capacitor is positioned in the container. The two plate capacitor has the form of an elongated cylindrical capacitor. Preferably, it is formed by two cylindrical plates which are spaced apart with a gap but the gap is filled with the gas being measured. It has been determined that the gas in the gap provides a change in the dielectric of the condenser which is proportional to or a function of density, and density of course is related to the pressure in the chamber. As the pressure goes up or down, the density and hence capacitance changes with it. Moreover, it changes with density substantially independent of temperature over a substantial range.

The condenser having the form of two cylindrical plates defines a probe. In that sense, it is an elongated or wand-like shape. Conveniently, it can be a simple wand with an external coating on it formed of a conductive metal thereby defining the smaller cylindrical plate. It is positioned in a fixed chamber or container. Such containers are ordinarily elongated and cylindrical, and advantage is taken of the fact that the container is usually an elongated cylinder constructed as the storage container. The inside wall can be used as the second plate. The fixed capacity storage container thus becomes part of the measurement device i.e., one plate of the capacitor. In an alternative aspect of the device, an elongated probe can be formed of first and second plates which are positioned in the container in the fashion of a removable elongated probe. Such a probe is constructed with the first and second plates separated by the same gap. The probe can become substantially rod-like i.e., it can be relatively long and quite narrow in diameter.

Such elongated probes are used in measurement of aviation fuel in the tank of military aircraft. Such high performance aircraft may invert in flight. Probes are typically used to measure the jet fuel in the aircraft i.e., a liquid having the nature of kerosene. At high altitudes when inverted, it is not uncommon for liquid fuel to form a froth where the effective fuel value of the foam is determined by the probe in the fuel tank of the high performance aircraft. Such probes however do not provide the requisite precision accuracy that is sought in the present equipment. Such aircraft related systems have an inaccuracy of about 5% when the tank is only half filled where the accuracy does improve somewhat as the fuel in the tank is depleted. The accuracy probably is around 2% when the tank is substantially empty. Such systems however find their greatest use in foaming liquids. By contrast, the present invention is very accurate, perhaps having an error of only a fraction of one object.

BRIEF SUMMARY OF THE DRAWINGS

So that the manner in which the above cited features, advantages and objects of the present invention are attained and can be understood in detail, a more particular description of the invention, briefly summarized above, may be had by reference to the embodiments thereof which are illustrated in the appended drawings. It is noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
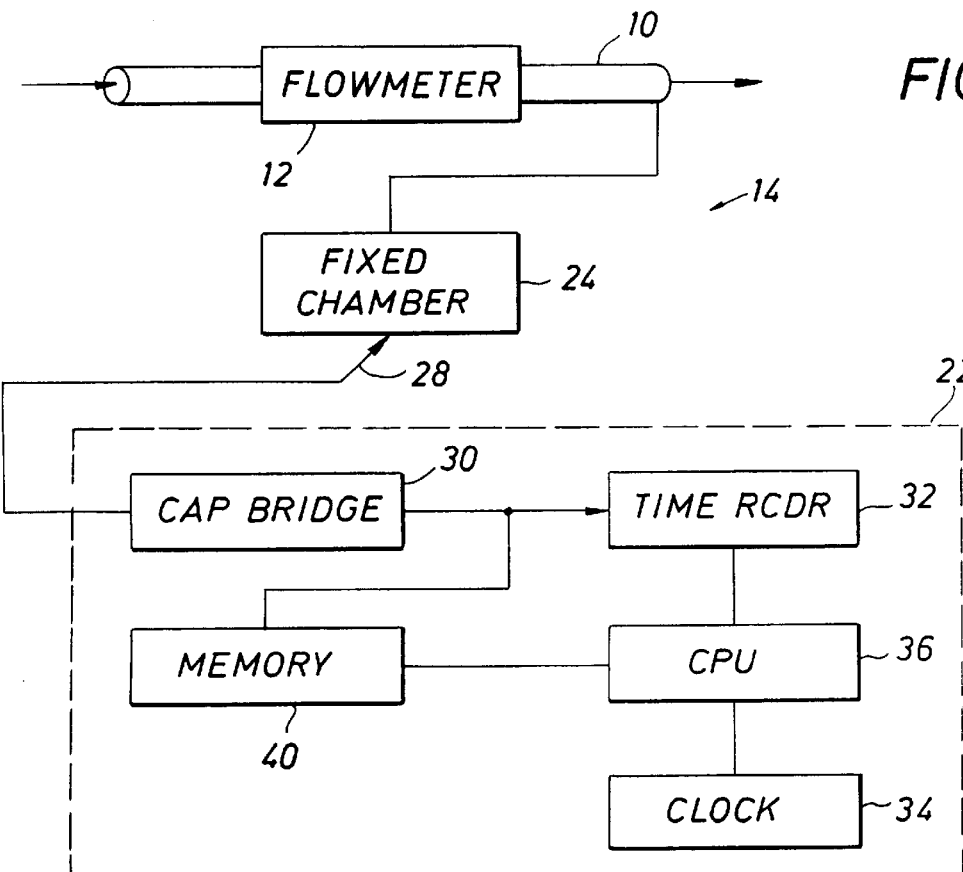
FIG. 1 is schematic view of a pipeline having a meter prover loop wherein the system of the present disclosure is connected with the meter prover loop.

Attention is first directed to FIG. 1 of the drawings which shows a pipeline equipped with a meter prover loop, flowmeter, and the precision measuring apparatus of the present disclosure. To provide the context, the first portion of the description will set forth details about the pipeline. Then more information will be given with regard the precise measuring system of this disclosure, and the theory of operation will be given. In FIG. 1 of the drawings, the numeral 10 identifies the pipeline which has a flowmeter 12 in it. The pipeline is constructed with a meter prover loop 14 which is constructed so that flow can be diverted into the loop by an appropriate diverter valve. Fluid flow through the meter is captured in a fixed volume tank or chamber during calibration and then is returned into the pipeline or vented. It is necessary to take certain measurements in the meter prover loop 14 to thereby vouch for or calibrate the flowmeter 12. The flowmeter 12 provides a steady stream of data with flowing gas. Nevertheless, there is always an apprehension that the flowmeter 12 may not generate the data accurately. For that reason, the flowmeter 12 must be provided with the equipment involved in the meter prover loop 14. Even more importantly the apparatus of the present disclosure is connected so that it can provide an accurate measure of flow and hence a calibration point for the flowmeter 12. It is common in large diameter pipelines to include the meter prover loop 14 at specified locations such as the locations adjacent to the flowmeter 12. For instance, in a pipeline of several hundred miles, there may be several measurement points where each is provided with a flowmeter 12 and the equipment of the present disclosure to assure that the meter prover loop 14 obtains accurate data.

The present invention is generally indicated by the numeral 20. It is a set of equipment which can be manufactured and sold as a unit. In that state of affairs, it is constructed as two components, the large component being the fixed volume chamber to be discussed and the remainder of the equipment includes the condenser probe which is inserted into the tank and the electronic components shown within the dotted line at 22. The electronics 22 can have the form of a pre-packaged set of equipment. It operates in conjunction with the fixed chamber just mentioned and that is identified by the numeral 24. The chamber 24 is provided with an input and return gas flow from the line 10. Typically, that is delivered through the meter prover loop 14. In one form, the meter prover loop 14 uses a downstream diverter valve to direct all flow to the tank 24 to fill the tank 24; the tank 24 is then emptied back into the pipeline or vented (if safe). Meter prover stations are well known in the art, and it is not necessary to detail the valves and pumps. Indeed, the meter prover loop 14 can connect on both sides of the flowmeter 12 as needed to handle flow in both directions. The chamber 24 in FIG. 1 is illustrated with two valves, one being connected from a tank fill line and the second being a valve controlled vent line connected to safely dispose of the natural gas by burning it, using it in a turbine pump or pumping it back into the line 10.

The fixed chamber 24 is filled with the gas at an elevated pressure in the fashion to be described. Discharging to the vent can be to atmosphere only if safety permits. If natural gas is flowing in the pipeline 10, the vent is directed to some sort of flare mechanism for burning or alternately is delivered to a pump where the discharged gas is raised to some pressure suitable for injection back into the pipeline 10 or for operation of local equipment. This is a safety aspect of the system which reduces discharge problems.

The fixed chamber 24 in the present invention may have any suitable volume. It will be described as an elongated cylindrical tank. It is built of metal because it, typically, must withstand elevated pressure. It is constructed with suitable hoops and end plates to assure tank strength and safety at elevated pressures. An elongated cylindrical tank is presumed, and preferably, is a tank where access is obtained for centerline insertion of a probe 28 as will be described.

Continuing for the moment with the structure shown in FIG. 1 of the drawings, the probe 28 is inserted into the fixed volume chamber 24. The probe 28 connected with a capacitor bridge 30 to measure the changes in capacitance as will be detailed. Those changes are output to a time base recorder 32. The system includes a clock 34 which provides a clock signal for a CPU 36. The CPU 36 is connected to the time recorder 32 to assure a time baseline for the recorder 32. The measured value of the capacitance is input to a memory 40 and it is interrogated periodically by the CPU 36. Data is obtained from the memory 40. Calculations are made in the CPU 36 as will be detailed and the calculations are output to the time recorder 32.

Figure 2:
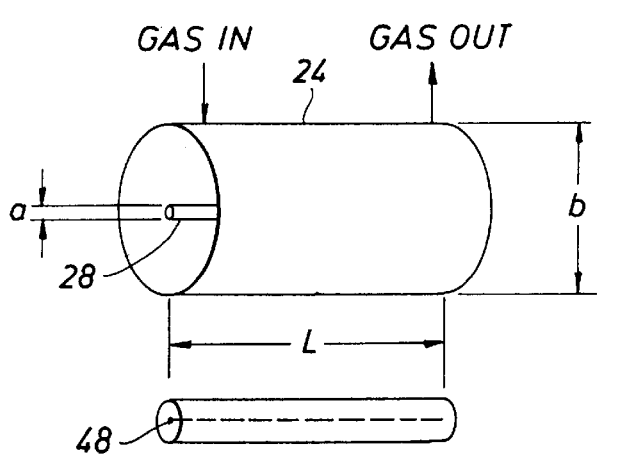
FIG. 2 is a simplified view of a tank showing a central probe in the tank and defining certain dimensions related to the capacitance of the probe in the tank.

Going now to FIG. 2 of the drawings, the tank 24 is shown with connections to deliver gas into the tank 24 and out of the tank 24. FIG. 2 omits the heads of the tank 24 for enhanced clarity. The tank 24 is further shown to have a length (L). As further marked in FIG. 2, the tank 24 itself, being formed of metal, can serve as one plate. The tank 24 diameter is represented by (b). The probe 28 positioned in the tank 24 is a rod of non-conducting material having a skin or surface of metal. It has a diameter represented by (a). In this construction, the rod 28 is ideally positioned along the centerline axis of the tank 24 so that the two condenser plates are concentric. FIG. 2 shows an alternate form of probe which is identified by the numeral 48. In this particular instance, the probe 48 is constructed with an elongated cylindrical outer shell and a central wire. It is similar to the large tank 24 serving as a condenser plate but it is simply smaller in diameter. In other words, the length (L) is the same but the two diametric dimensions are simply smaller.

THEORY OF OPERATION

The measured capacitance depends upon the geometry of the two conductors and the dielectric constant of the material between them. For a cylindrical capacitor, the capacitance is given by $$C = 2\pi\varepsilon\varepsilon_0 \frac{L}{\ln\left(\frac{b}{a}\right)}$$

where $\varepsilon_0 = 8.85$ pF/m is the primary constant, L is the length of the cylinder, b is the inner radius of the outer cylinder, a is the outer radius of the inner cylinder and $\varepsilon$ is the dielectric constant of the material between the two conductors, which would be natural gas in this case. Because the geometry of the apparatus is fixed, changes in the measured capacitance will reflect changes in the dielectric constant of the gas which fills the capacitor. The primary change in the dielectric constant will come from the change in the density of the gas upon loading and unloading the tank 24. The dielectric constant of the gas is related to the molar density by $$\frac{\varepsilon - 1}{\varepsilon + 2} = A_\varepsilon\rho + B_\varepsilon\rho^2 + C_\varepsilon\rho^3 + \ldots$$

where $\varepsilon$ is the dielectric constant, $\rho$ is the molar density, and $A_\varepsilon$, $B_\varepsilon$, an $C_\varepsilon$ are dielectric virial coefficients. For the range of densities that will occur in the tank 24, the second and third terms on the right side of the equation are less than 0.03% of the first term at pressures up to 15 bar. These calculations were made for several different substances including methane and ethane. Table 1 includes the calculated values of the dielectric constants for methane. Notice how neglecting the second and third dielectric virial coefficients (Boew, 1991) has almost no effect on the calculated dielectric constant in this pressure range.

TABLE 1

($\varepsilon$ − 1)/($\varepsilon$ + 2) for Methane over Expected Pressure Range

| Temperature (K.) | Pressure (bars) | Density (mole/L) | $A_\varepsilon\rho$ | $A_\varepsilon\rho + B_\varepsilon\rho^2$ | $A_\varepsilon\rho + B_\varepsilon\rho^2 + C_\varepsilon\rho^3$ |
|---|---|---|---|---|---|
| 298 | 1.2387 | 0.05 | .000329 | .000329 | .000329 |
| 298 | 2.4774 | 0.1 | .000658 | .000659 | .000659 |
| 298 | 12.3845 | 0.5 | .003289 | .003290 | .003290 |

The dielectric virial coefficients also were shown to be practically independent of temperature over a wide temperature range. Table 2 includes the dielectric constants at different temperatures.

TABLE 2

Dielectric Constants for Methane at Different Temperatures

| Temperature (K.) | Pressure (bars) | Density (mole/L) | $\varepsilon(A_\varepsilon)$ | $\varepsilon(A_\varepsilon, B_\varepsilon)$ | $\varepsilon(A_\varepsilon, B_\varepsilon \& C_\varepsilon)$ |
|---|---|---|---|---|---|
| 220 | 0.9145 | 0.05 | 1.000992 | 1.000992 | 1.000992 |
| 298 | 1.2388 | 0.05 | 1.000987 | 1.000987 | 1.000987 |
| 323 | 1.3427 | 0.05 | 1.000987 | 1.000987 | 1.000987 |
| 220 | 9.1436 | 0.5 | 1.009952 | 1.009957 | 1.009957 |
| 298 | 12.3844 | 0.5 | 1.009900 | 1.009904 | 1.009904 |
| 323 | 13.4229 | 0.5 | 1.009897 | 1.009901 | 1.009901 |

Since $A_\varepsilon$ is independent of temperature and the higher order density terms are negligible, temperature and density gradients within the tank 24 will have minimal effect on the measurements during the filling and releasing process are feasible.

If the second equation is truncated after the first term on the right, the total number of moles of gas in the tank is given by $$n_{total} = \rho V_{acc} = \frac{V_{acc}\varepsilon - 1}{A_\varepsilon\varepsilon + 2} = \frac{V_{acc}\left(\frac{C}{C_0}\right) - 1}{A_\varepsilon\left(\frac{C}{C_0}\right) + 2}$$

where C is the capacitance measured with gas present, $C_0$ is the capacitance at vacuum and $V_{acc}$ is the volume of the fixed tank 24. The flow rate is then related to the measured capacitance by $$\frac{dn}{dt} = \text{molar flow rate} = \frac{V_{acc}}{A_\varepsilon C_0} \frac{3}{\left[\left(\frac{C}{C_0}\right) + 2\right]^2} \frac{dC}{dt}$$

The volume of the tank 24, the vacuum capacitance, and the dielectric virial coefficient are determined in separate experiments and the capacitance is measured as a function of time during the charging and discharging of the tank 24. After obtaining (dC/dt) from the experimental values, the fourth equation can be used to calculate the molar flow rate. One or more ancillary measurements are required for natural gas mixtures of unknown composition to account for the variation of the dielectric constant with composition. The technology for these measurements is well known.

EXPERIMENTAL DESIGN

A large, high pressure tank located at the Turbomachinery Laboratory in the Department of Mechanical Engineering at Texas A&M University was used to approximate a cylindrical capacitor. The tank was not a perfect cylindrical capacitor, however, due to the end effects of the tank. The end effects combined with the lead capacitance results in a capacitance higher than that for the ideal case. The dimensions of the concentric conductors along with the support structure for the copper pipe are shown in FIG. 2. For experimental runs, the tank is usually pressurized to about 1.4 MPa and then discharged through a bank of sonic nozzles that maintain a constant mass flow rate out. The most accurate measurements of changes in the capacitance are made this way because the flow rate is established to ±0.1% using the bank of sonic nozzles as a primary flow standard. The inner capacitance electrode was a 6.7 m length of 2.9 cm I.D. copper pipe supported inside the tank by wooden rods such that the pipe was centered in the tank. The wall of the tank served as the second electrode. The change in capacitance was measured using an automated capacitance bridge made by Andeen-Hagerling which is accurate to $10^{-5}$ picofarad. Measurement of the capacitance by bridge techniques is complicated by the requirement that, because the tank wall is grounded, one electrode of the capacitor must be grounded during the bridge measurement. The most accurate capacitance measurements are achieved using a three-terminal arrangement because stray capacitance does not affect the results (Thompson, 1958). Neither capacitor electrode may be grounded in the three-terminal arrangement. In the two-terminal bridge configuration one electrode is grounded, but stray capacitances affect the measurement directly. In the final design, the bridge measurement may be replaced by an oscillator for which the frequency varies as the capacitance varies.

Two potential problems are the effects of the thermal expansion of the conductors and the possibility that density gradients exist during flow in and out of the tank. In equation (1), everything on the right hand side of the equation was considered to be constant with respect to time except for the dielectric constant of the gas, which depends on the density of the gas in the tank. If the thermal expansion is significant, however, the length and radius of the conductors will change with respect to time since the temperature is changing with time. Since the observed chance in capacitance is normally around 1 picofarad, almost any change in the geometry of the capacitor will produce a significant change in the capacitance measurement. The concern regarding density gradients is important because, if the density is not uniform throughout the tank, then the dielectric constant of the gas becomes a function of probe position. That problem seems insignificant.

EXPERIMENTAL RESULTS

Figure 3:
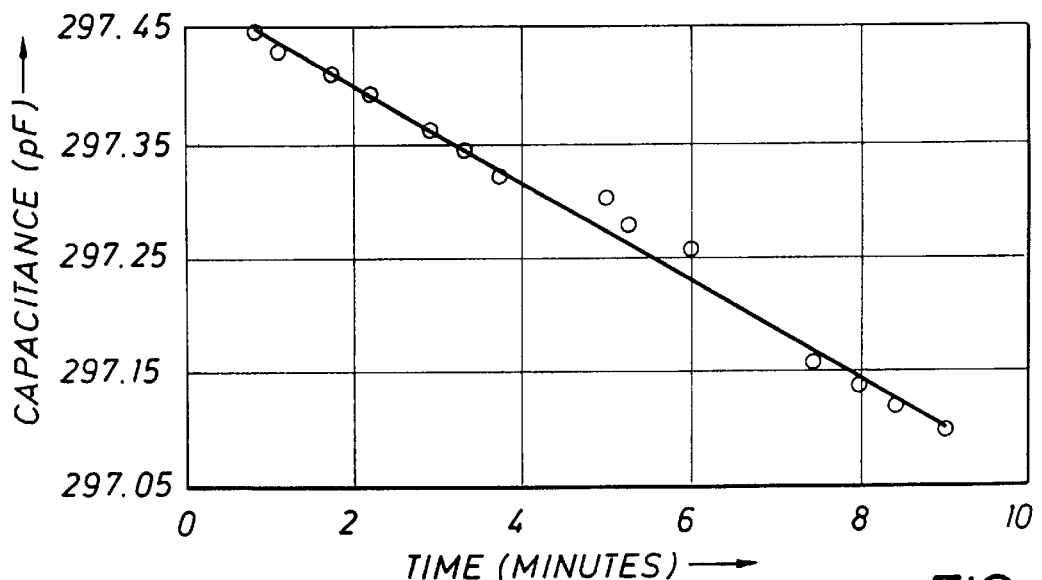
FIGS. 3 and 4 are similar curves showing capacitance as a function of time for different flow rates.
Figure 4:
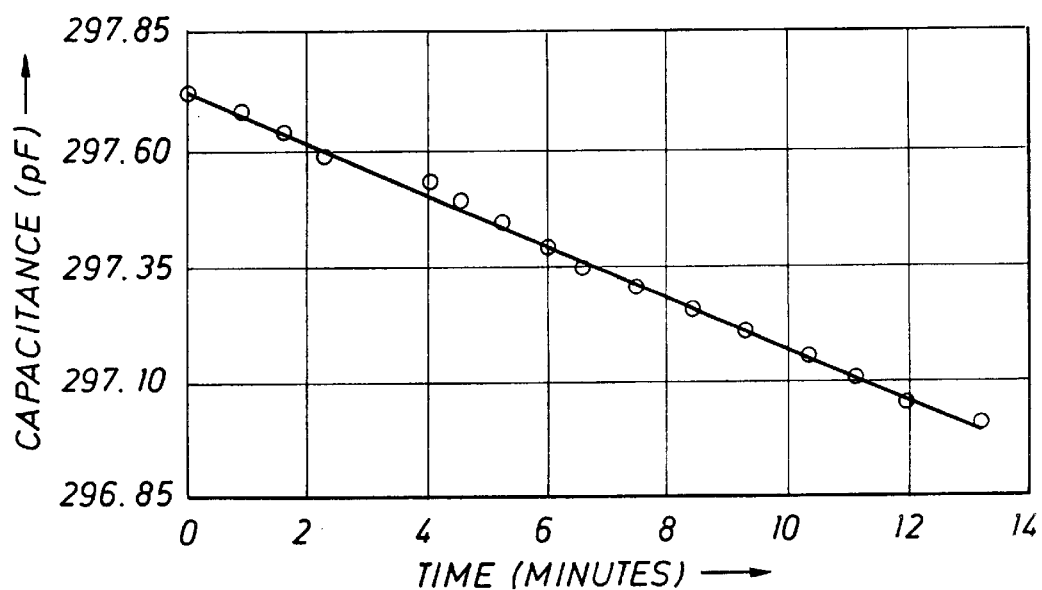

Several experimental measurements provided the change in capacitance with respect to time. Because the flow rate out can be maintained at a constant rate, dC/dt during depressurizing is of more interest. Performance over a selected range of mass flow rate, demonstrates that the technique works for low flow rates as well as high flow rates. The graphs of FIGS. 3 and 4 were carried out at mass flow rates of 0.1247 kg/s ($1.30 \times 10^4$ SCFH) and 0.2091 kg/s ($3.19 \times 10^5$ SCFH) respectively. From the graphs, the capacitance is observed to linearly vary with time at a constant mass flow rate.

One consideration involving the use of the copper pipe as the center conductor was that it has a relatively high rate of thermal expansion. The temperature can change as much as 30° C. when the tank 24 is depressurized and then pressurized again. This corresponds to a change in capacitance of about 0.04 picofarads from the thermal expansion of the copper tube. Since the overall observed capacitance change during depressurizing is only about 1 picofarad, the thermal expansion of the copper is not negligible and must be taken into account. One possibility for dealing with the effect of thermal expansion is using a material such as Invar, which has a low thermal expansion coefficient, for the center conductor. Since the tank 24 is so large and the outer surface is stable at the temperatures of the atmosphere, the thermal expansion of the tank is negligible.

Figure 5:
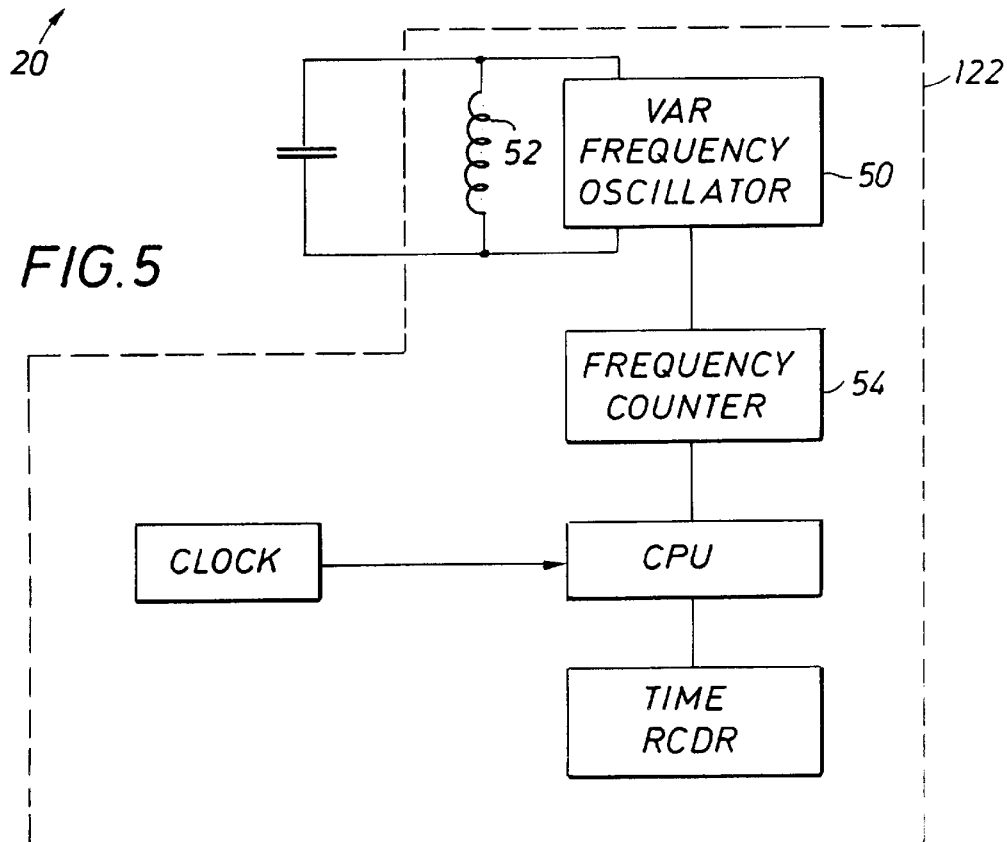
FIG. 5 is an alternate circuit construction.

The version of electronic equipment 122 shown in FIG. 5 uses a modified detector system comprising a variable frequency oscillator 50 controlled by a tank circuit formed of the condenser 28 and a fixed coil 52. The change in measured capacitance causes a change in the tank resonance and that changes the oscillator output frequency of the oscillator 50. The signal frequency counter 54; the shift can be readily calibrated to define the tank capacity (meaning density) of gas. This arrangement provides very accurate measurements.

While the tank 24 can be very large, it can also be smaller such as a cylinder of about one meter in length and perhaps 0.6 to 0.8 meter in diameter to be filled to highway vehicles such as bulldozers, forklifts, graders and the like. By using this size of cylindrical tank, the truck mounted saddle tanks can be replaced to enable gas powered operation. An automotive version requires different tank dimensions, e.g., perhaps a cylinder of 1.2 meters diameter having a height of 0.2 to 0.4 meters. In the tanks resembling a flat circular pancake, distortion by metal heads of condenser can be reduced by using fiberglass heads. Indeed, a spherical tank can be measured with the more narrow probe 48 (see FIG. 2) with minimal distortion, especially if the tank shell is lined with fiberglass and the tank shell metal is not part of the condenser plate.

While the foregoing is directed to the preferred embodiment, the scope thereof is determined by the claims which follow.

What we claim is:

1. A method of measuring the quantity of gas in a gas handling system comprising the steps of:
   (a) defining a gas containing chamber for receiving gas therein at a pressure determined by the gas handling system wherein the gas containing chamber has a fixed volume, and
      (i) said chamber is an elongate cylinder,
      (ii) placing an elongate, cylindrical, metal surface therein, and
      (iii) positioning a centered cooperative metal surface to define two spaced plates therein,
   (b) positioning said two spaced plates in said chamber to define a capacitor having a dielectric between the two plates wherein said chamber fills the space between the two plates with the gas to function as the capacitor dielectric; and
   (c) measuring the quantity of gas in the chamber by measuring the capacitance of the capacitor wherein capacitance is expressed as a quantity of gas in the chamber.

2. The method of claim 1 wherein said chamber is connected for filling from a gas source and is also connected for draining of said chamber, and further including the step of exhausting under gas pressure drive at least part of the gas therein, and measuring chamber pressure drop over a time interval while exhausting.

3. The method of claim 1 including the step of measuring capacitance of the two plates by connecting the capacitance into a tank circuit and measuring tank circuit change as a function of tank circuit frequency.

4. The method of claim 3 including the step of connecting the two plates in the tank circuit and connecting the tank circuit in a variable frequency oscillator and measuring oscillator output frequency.

5. The method of claim 1 including the step of measuring capacitance in a bridge circuit and recording measurements as a function of time.

6. The method of claim 5 including the step of forming the two spaced plates with one plate defined by a surrounding cylinder chamber wall.

7. The method of claim 1 wherein one of said plates is formed by a centerline positioned wire in said chamber.

8. The method of claim 7 wherein said centerline wire is surrounded by and concentric with a hollow metal cylinder.

9. The method of claim 1 wherein said chamber is formed with two ends and an elongate cylinder there between formed with an exposed internal metal face of specified cylindrical construction, and a second concentric elongate centered second metal lace is positioned therein, and has the same length.

10. Apparatus measuring gas density comprising:
    (a) an elongate cylindrical storage chamber;
    (b) a flow line connected to said chamber enabling said chamber to be filled to a specified pressure and drained of gas stored therein;
    (c) spaced conductive plates in said chamber having a dielectric therebetween defined by gas stored in said chamber;
    (d) a capacitance measuring circuit connected to said plates to measure capacitance wherein measurements are expressed as a chamber pressure;

(e) a time based recorder; and (f) wherein said measuring circuit is connected to said recorder to record over time measured capacitance expressed as a quantity of gas in the chamber.

11. The apparatus of claim 10 wherein said circuit comprises a capacitance bridge connected to a recorder.

12. The apparatus of claim 11 wherein said measuring circuit comprises a tank circuit including said capacitance connected in a variable frequency oscillator.

13. The apparatus of claim 12 wherein said oscillator is connected to said time based recorder and records chamber pressure as a function of time.

14. The apparatus of claim 13 wherein said reccorder measures over a fixed time interval the change of pressure of said chamber, and said recorder measurements are converted by a computer into flow rate.

15. The apparatus of claim 14 wherein said computer provides flow rate, and including a meter prover loop connected to said chamber so that said chamber cooperates with a meter prover loop to determine flow rate in a pipeline connected to said meter prover loop.

16. The apparatus of claim 15 wherein said meter prover loop connects to said pipeline.

17. The apparatus of claim 16 wherein said spaced plates are:

(a) concentric;

(b) metal surfaced;

(c) radially spaced;

(d) elongate;

(e) axially aligned in said chamber; and (f) define a cylindrical capacitor in said chamber.

18. The apparatus of claim 17 wherein said spaced plates are in said chamber and said chamber is formed with end located heads so that said chamber comprises an elongate metal right cylinder wall, and said heads close said cylinder, and are non metallic.

19. The apparatus of claim 17 wherein said plates are a wire and cylinder there around.

20. A method of measuring a volume of gas in a gas handling system comprising the steps of:

(a) defining a gas containing chamber for receiving gas therein at a pressure determined by the gas handling system wherein the gas containing chamber has a fixed volume;

(b) positioning two spaced plates in said chamber to define a capacitor having a dielectric between the two plates wherein said chamber fills the space between the two plates with the gas to function as the capacitor dielectric;

(c) measuring the capacitance of the capacitor by connecting the capacitance into a tank circuit in a variable frequency oscillator and measuring oscillator output frequency; and (d) expressing measured capacitance as a quantity of gas.

21. The apparatus of claim 20 wherein said chamber is an elongate cylinder, including the step of placing an elongate cylindrical metal surface therein, positioning a centered cooperative metal surface to define said two spaced plates therein, then measuring capacitance so that cylindrical volume is expressed as a quantity of gas within the cylindrical volume.

22. The method of claim 20 wherein said chamber is connected for filling from a gas source and is also connected for draining of said chamber, and further including the step of exhausting under gas pressure drive at least part of the gas therein, and measuring chamber gas quantity decrease over a time interval while exhausting.

23. The method of claim 20 including the step of measuring capacitance in a bridge circuit and recording measurements as a function of time.

24. The method of claim 23 including the step of forming the two spaced plates with one plate defined by a surrounding cylinder chamber wall.

25. The method of claim 20 wherein one of said plates is formed by a centerline positioned wire in said chamber.

26. The method of claim 25 wherein said centerline wire is surrounded by and concentric with a hollow metal cylinder.

27. The method of claim 20 wherein said chamber is formed with two ends and an elongate cylinder there between formed with an exposed internal metal face of specified cylindrical construction, and a second concentric elongate centered second metal face is positioned therein, and has the same length.

* * * * *